United States Patent [19]

Michel

[11] Patent Number: 4,488,194

[45] Date of Patent: Dec. 11, 1984

[54] MAGNETORESISTANT TRANSDUCER FOR READING VERY HIGH-DENSITY DATA

[75] Inventor: Helle Michel, Marcq, France

[73] Assignee: Compagnie Internationale pour l'Informatique Cii-Honeywell Bull, Paris, France

[21] Appl. No.: 351,342

[22] Filed: Feb. 23, 1982

[30] Foreign Application Priority Data

Mar. 20, 1981 [FR] France .................. 81 05601

[51] Int. Cl.³ .................. G11B 5/12; G11B 5/30
[52] U.S. Cl. .................. 360/113
[58] Field of Search .......... 360/113; 324/252; 338/32 R

[56] References Cited

U.S. PATENT DOCUMENTS

| 3,626,396 | 12/1971 | Eastman | 360/123 |
|---|---|---|---|
| 3,731,007 | 5/1973 | Masuda et al. | 360/113 |
| 4,179,719 | 12/1979 | Imamura et al. | 360/112 |
| 4,321,640 | 3/1982 | Van Gestel | 360/113 |

FOREIGN PATENT DOCUMENTS

| 52-90919 | 7/1977 | Japan . | |
| 53-101411 | 9/1978 | Japan . | |
| 55-4738A | 1/1980 | Japan | 360/113 |

OTHER PUBLICATIONS

IBM Tech. Disclosure, p. 124, vol. 9 #2, Jul. 1966.
IBM Tech. Disclosure, p. 3278, vol. 16 #10, Mar. 1974.
IBM Tech. Disclosure, p. 3123, vol. 15 #10, Mar. 1973.

Primary Examiner—Bernard Konick
Assistant Examiner—Paul Stefanski
Attorney, Agent, or Firm—Kerkam, Stowell, Kondracki & Clarke

[57] ABSTRACT

A magnetoresistant transducer is described for reading very high-density data. The magnetoresistant transducer (TMRI) includes at least one magnetoresistor (MRI) of an anisotropic magnetic material placed perpendicular to the direction in which the data of a medium (SM) pass. The axis (AFAI) of easy magnetization of the magnetoresistor is normal to the medium and includes a thin, mono-range or single domain magnetic anisotropic layer (CI) normal to the medium and to the direction in which the data pass. The mono-range or single domain layer is strongly coupled magnetically with the magnetoresistor, and its axis of easy magnetization (AFACI) is normal to the medium and opposite in direction to the axis of easy magnetization of the magnetoresistor. The invention is particularly applicable to the reading of magnetic tapes and disks containing high density data.

9 Claims, 18 Drawing Figures

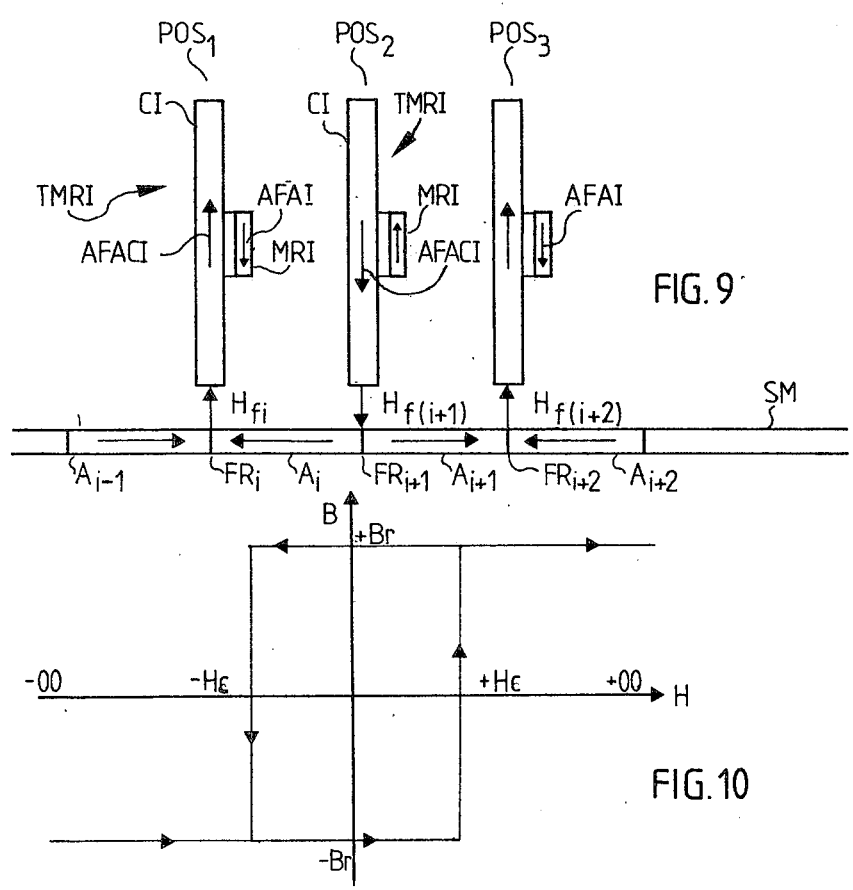
FIG. 9
FIG. 10
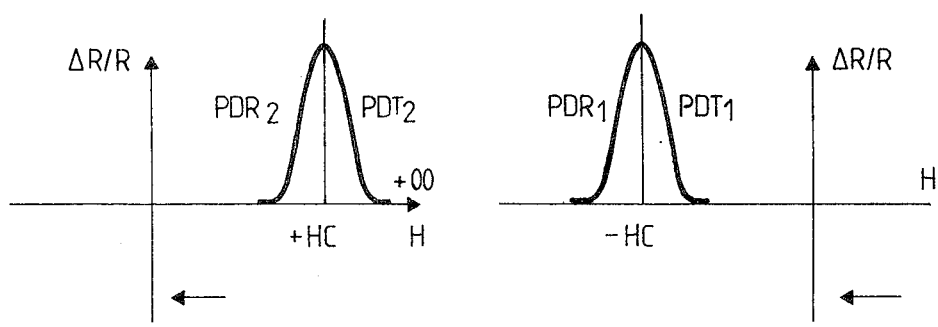
FIG. 11b          FIG. 11a

MAGNETORESISTANT TRANSDUCER FOR READING VERY HIGH-DENSITY DATA

FIELD OF THE INVENTION

The present invention relates to magnetoresistant transducers. It is in particular applicable to the reading of the data contained on magnetic recording media such as rigid or flexible magnetic disks and magnetic tapes, and is more particularly intended for the reading of data having a very high density, i.e. greater than 5000 pieces of information per centimeter.

DESCRIPTION OF THE PRIOR ART

Magnetic disks carry data on circular, concentric recording tracks, which have a radial width on the order of several tens of microns and generally cover the greater part of their two sides. Magnetic tapes, on the other hand, generally carry data on tracks parallel to the length of the tape. Generally, a stream of magnetic data on tracks parallel to the length of the tape.

Generally, a stream of magnetic data recorded on the tracks of a disk or a tape appear in the form of succession of small magnetic ranges called "elementary ranges" distributed over the entire length of the track and having magnetic inductions with the same modulus and the opposite direction.

The number of pieces of information per unit of length measured along the circumference of a track in the case of a magnetic disk or according to the length of the tape in the case of a magnetic tape is called longitudinal density (or linear density). When the density is greater than 5000 pieces per centimeter the medium is considered to have a very high density and may be termed a VHD disc or VHD tape, as the case may be. The number of recording tracks per unit of length measured along the diameter of the disk is called the radial density of the data (in the case of a magnetic disk). The present trend in the development of magnetic disks is to increase both the linear density and the radial density of the data.

The means which make it possible, either to record data on disks or tapes or to read data recorded thereon, or again to perform both of these functions are called "magnetic transduction systems". Generally, there is associated with a recording medium one or more magnetic transduction systems with the medium being driven so as to move past the system or systems. In current practice, when it is desired to read very high-density linear and/or radial data magnetic disks, more and more frequently resort is made to transduction systems which include one or more magnetoresistors designated under the name of "magnetoresistant transducers". It may be recalled that a magnetoresistor is an element consisting of a magnetic material the electrical resistance R of which varies according to the magnetic field to which it is subjected. In current practice, these magnetoresistors are electrical resistors having the form of very thin layers (several hundred angstroms to several microns), the length of which is much greater than the width. Frequently, these magnetoresistors are arranged over a substrate of an electrically insulating material.

To provide a better understanding of the invention, a brief review of applicable magnetic principles will be undertaken. Consider, for example, a measurement magnetoresistor R connected to the terminals of a current generator which produces a current having an intensity I circulating in the direction of the length of the magnetoresistor and assume that the magnetoresistor is part of a magnetoresistant transducer associated with a magnetic recording medium and that it is located at a very small or even nil distance from the medium. When each of the elementary magnetic fields passes in front of the transducer, an overflow magnetic field $H_f$ created in the vicinity of the surface of the medium causes a variation $\Delta R$ in its resistance, whence a variation $\Delta V = I \times \Delta R$ at its terminals, which gives $\Delta v/V = \Delta R/R$, $\Delta R/R$ being called the magnetoresistance coefficicent. Ordinarily this coefficient is on the order of 2%. It can, therefore, be seen that the variation in voltage picked up at the magnetoresistor's terminals increases with the resistance R.

The electrical signal picked up at the terminals of a magnetoresistor is only a function of the magnetic value $H_f$ to which it is subjected. Because of this, its amplitude is independent of the speed of the recording medium face with which it is associated.

It may be recalled that the ratio (B/H) between the induction of the magnetic field and the magnetic field itself when B and H are close to zero on the curve of first magnetization is designated as the "initial magnetic permeability of a magnetic material". (The curve of first magnetization is the curve which gives the variation of B as a function of H when the magnetoresistor is subjected to a magnetic field of magnetization beginning with an initial magnetic state of the material defined by B and H close to zero). In other words, the initial magnetic permeability of the material is equal to the slope of the curve of first magnetization in the vicinity of the point B=0 and H=0.

It may further be recalled that a magnetic anisotropic material located in a plane and having a thickness far less than its length and also its width, presents in this plane two privileged magnetization directions, generally perpendicular to one another. One of them is called "direction of easy magnetization," while the other is called "direction of difficult magnetization". The initial permeability of the material in the direction of difficult magnetization is much greater than the initial permeability of the material in the direction of easy magnetization.

Generally, magnetoresistors consist of a magnetically anisotropic material (for example, an iron-nickel alloy with 18% iron and 82% nickel). Their axis of easy magnetization is parallel to the direction of the current I and to their length, while their axis of difficult magnetization is perpendicular to the direction of the current.

In current practice, the position of the magnetoresistor of a magnetoresistant transducer in relation to the recording medium associated with it is such that it is subjected to a component of the overflow field of the elementary ranges which is parallel to the axis of difficult magnetization, the magnetoresistor itself being perpendicular to the surface of the medium. When a magnetoresistor is not subjected to any magnetic field, we say that it is at rest. In this case, the magnetization (i.e., the magnetic induction inside the magnetoresistor) has the same direction as the axis of easy magnetization.

Generally, the efficiency and likewise the sensitivity, of a magnetoresistor of a magnetically anisotropic material, i.e., the voltage of its output signal as a function of the magnetic field applied to it, may be determined by subjecting the magnetoresistor to a magnetic polarization field $H_{pol}$ parallel to its axis of difficult magnetization as described in French Pat. No. 2,165,206 entitled "Improved Magnetoresistors and Electromagnetic Transducer Incorporating Them".

The value of the polarization field $H_{pol}$ is selected such that the magnetization of the magnetoresistor turns at an angle $\theta$, preferably close to 45°, in relation to its position at rest.

In present practice, the linear and radial densities of the data obtained are such that the length of the elementary magnetic ranges is slightly greater than a micron and the radial width $L_p$ of the tracks is on the order of 10 to 20 microns. Under these conditions, the component of the overflow field of the elementary ranges to which the magnetoresistor is subjected is relatively low. In order to obtain a maximum signal/noise ratio, the dimensions of the magnetoresistor must be such that its height h measured according to a direction normal to the recording medium, and its length measured perpendicularly to the direction in which the data pass must be respectively on the order of 5 and 15 microns. Technologically, it is extremely difficult to achieve magnetoresistors having such dimensions. In current practice, the height h of magnetoresistors is on the order of 20 microns and may even reach 40 to 50 microns. In the latter case, these magnetoresistors are intended for reading data on magnetic tapes and the magnetoresistors are maintained in contact with the magnetic tape causing the magnetoresistive material to be quickly worn away.

It can be shown that the signal/noise ratio drops if h increases. Indeed, the signal at the terminals of a magnetoresistor subjected to the component of the magnetic overflow field normal to the medium drops as h increases, since the section of the magnetoresistor increases and consequently its resistance R diminishes. Furthermore, the noise signal increases and consequently its resistance R diminishes. Furthermore, the noise signal increases, since the component of the magnetic overflow field $H_f$ acts on the magnetoresistor only to a height h' lower than h. To increase the S/N signal, we are therefore let to increase the resistance of the magnetoresistor, i.e., to increase its length, which makes it possible to increase the useful signal S. In this case, the width of the track is less than the length of the magnetoresistor. The latter is then subjected to a part of the magnetic overflow fields produced by the tracks neighboring the track which the magnetoresistor faces.

Under these conditions, to improve the S/N ratio, magnetoresistant transducers are used which have two parallel magetoresistant elements separated by a distance on the order of a tenth of a micron, less than the length of the elementary magnetic ranges, such that these magnetoresistors are subjected to the same component of the magnetic overflow, i.e., that produced by the range in front of which they are located. The two magnetoresistant elements are each polarized to a value on the order of 45° (in absolute value), their magnetization then being at a value of 90° relative to one another. The output signal from the first magnetoresistant element is sent over a first lead-in of a differential amplifier, while the output signal from the second magnetoresistant element is sent over a second lead-in of the same amplifier. The absolute value of the output signal of the amplifier is proportional to twice the absolute value of the output signal of a single magnetoresistor and the signal/noise ratio is appreciably improved.

In such an arrangement, the two magnetoresistors are subjected not only to the component $H_f$ of the magnetic overflow field produced by the magnetic range of the track P which they face, but also to the resultant of the magnetic overflow fields produced by the magnetic ranges located on this same track P, on either side of the range which they face. This resultant produces a noise signal which increases when the linear density of the data increases. It is then more difficult to discern any useful signal corresponding to a piece of data information of a track in a medium in relation to the noise signal. To cancel out the effects of this resultant on the output signal of the magnetoresistors, resort may be made to the use of magnetic screening means disposed on either side of the magneresistors. The magnetic screening means may consist of magnetic material, preferably anisotropic, the plane of which is perpendicular to the recording medium and to the direction in which the tracks move.

However, such magnetoresistant transducers have a certain number of drawbacks, the most important of which can be categorized into three types as follows:

1. When the linear density of the data reaches a value on the order of 5000 inversions of magnetic flux per centimeter (which corresponds to 5000 changes in the direction of the magnetic induction), the following phenomena are produced:

(a) the resultant of the magnetic overflow fields produced by the ranges of the track P which surround the range which the two magnetoresistors of the magnetoresistant transducer face becomes significant (on the order of the component $H_f$ of the magnetic overflow field);

(b) the distance between the magnetic screening means and the magnetoresistant elements becomes so low (on the order of a micron) that the magnetic coupling between the magnetoresistant elements and the screening means becomes significant.

As a result of the two phenomena described above, a major mutual induction is produced between the magnetic screening means and the magnetoresistant elements which appreciably modifies the magnetization in them (intensity of the magnetization, angle of polarization), and this increases with the linear density of the data. This mutual induction results in an interference signal which may destroy the information which is to be read, i.e., which may totally cancel out the effects of the component $H_f$ of the magnetic overflow field on the two magnetoresistors.

2. There is a phase difference between the two magnetoresistors such that the distance between them and the magnetic recording medium is different. This results in the value of the magnetic field to which each of the two magnetoresistors is subjected being different, and consequently the output signal at their terminals is different. This difference may be relatively major. As a result, it becomes difficult to exploit the signals delivered by the differential amplifier connected to this magnetoresistant transducer.

3. The technological realization of magnetoresistant transducers of this type is delicate, and the cost of these tranducers increases when the linear density of the data increases.

SUMMARY OF THE INVENTION

The present invention makes it possible to remedy or at least minimize the above drawbacks in that there is provided a magnetoresistant transducer of extremely simple design, utilizing only one magnetoresistor in which the S/N ratio is relatively large, the magnetoresistor being virtually insensitive to the magnetic overflow fields other than the component $H_f$ of the magnetic overflow field produced by the elementary magnetic range which it faces. Furthermore, the useful signal is increased by using a magnetoresistor with a length greater than the radial width of the tracks (which increases resistance, as has been stated above).

The principle of the invention consists of using a magnetoresistor in which the axis of each magnetization is perpendicular to the recording medium, this magnetoresistor being strongly coupled magnetically to a thin, magnetic mono-range or single domain of an anisotropic magnetic material, in which the axis of easy magnetization is likewise normal to the recording medium. The axes of easy magnetization of the magnetoresistor and the mono-range or single domain layer are antiparallel, the plane of the mono-range layer being perpendicular to the recording medium and to the direction in which the data move.

When the component $H_f$ of the magnetic overflow field produced by the range which the magnetoresistor faces has a sign opposite that of the axis of easy magnetization of the mono-range or single domain layer, there is a reversal in the direction of the axis of easy magnetization in the mono-range or single domain layer, and because of the significant magnetic coupling between the layer and the magnetoresistor there is a reversal in the direction of the axis of easy magnetization in the magnetoresistor, which produces a variation $\Delta R$ in it which is relatively significant. The reversal in the direction of the magnetization takes place only if the value of the component $H_f$ is greater than the coercive field $H_c$ of the magnetic material constituting the mono-range or single domain layer.

It may be recalled that by definition the magnetic induction (magnetization of a thin, magnetic, mono-range or single domain layer has the same direction at any point whatsoever on that layer. When reference is made herein to mono-range layer, it should be understood to refer to a single domain layer and the terms "mono-range" and "single domain" are used interchangeably throughout the specification.

According to the invention, there is provided a magnetoresistant transducer for reading data contained on a recording medium having at least one magnetoresistor of an isotropic material placed perpendicular to the direction in which the data pass, through which a current I runs in the direction of its length. The axis of easy magnetization of the magnetoresistor is normal to the medium and it has a thin, magnetic, anisotropic layers and mono-range normal to the medium and to the direction in which the data pass. The magnetic mono-range is strongly coupled magnetically with the magnetoresistor, and the axis of easy magnetization is normal to the medium and opposite in direction to that of the magnetoresistor. There is thus provided an extremely simple, inexpensive magnetoresistant transducer in which the signal/noise ratio is significantly improved over conventional devices.

BRIEF DESCRIPTION OF THE DRAWINGS

Other characteristics and advantages of the present invention will appear in the following description, given by way of nonlimiting examples and with reference to the following drawings in which FIG. 1 made up of FIGS. 1a and 1b illustratively summarize the operating principle of an elementary magnetoresistant transducer having a simple resistor of an anisotropic magnetic material.

FIG. 3 makes it possible to understand how a magnetoresistor is subjected to the resultant of the magnetic overflow fields created by the elementary magnetic ranges located on the track P and close to the elementary magnetic range which the magnetoresistor faces.

FIG. 4 shows one of the two magnetoresistors according to the prior art arranged facing a track P of the disk and makes it possible to understand how this magnetoresistor is subjected to the resultant of the magnetic overflow fields created by the tracks next to the track P.

FIG. 5 makes it possible to understand how the magnetoresistor is subjected to the component $H_f$ of the magnetic overflow field of the elementary magnetic ranges of the track P only over part of its height.

FIG. 7 makes it possible to illustrate one of the drawbacks of such a transducer.

FIG. 8 diagramatically illustrates the principle of a magnetoresistant transducer according to the invention and comprises FIGS. 8a and 8b.

FIGS. 9, 10 and 11 make it possible to illustrate the operation of the magnetoresistant transducer according to the invention shown in FIG. 8.

FIG. 9 diagramatically illustrates a transducer according to the invention before a change in magnetic induction direction from a first direction and before a change in magnetic induction direction from a second direction. FIG. 9 illustrates the two different magnetic states that the monorange magnetic layer and the magnetoresistor of the magnetorresistant transducer, respectively, may have according to the invention.

FIG. 10 illustrates the hysteresis cycle of the magnetic material constituting the thin mono-range layer.

FIG. 11 illustrates the curve of variation of the magnetoresistance coefficient of the magnetoresistor as a function of the magnetic field applied to it in the direction of its axis of easy magnetization and comprises FIGS. 11a and 11b. FIG. 11a shows this curve of variation when the magnetic field varies from a positive value to a negative value higher than the coercive field of the magnetoresistor. FIG. 11b shows the curve of variation of this same coefficient of magnetoresistance when the magnetic field varies from a negative value to a positive value higher in absolute value than the coercive field of the magnetic material constituting the magnetoresistor.

DESCRIPTION OF THE PREFERRED EMBODIMENTS

Figure 1B:
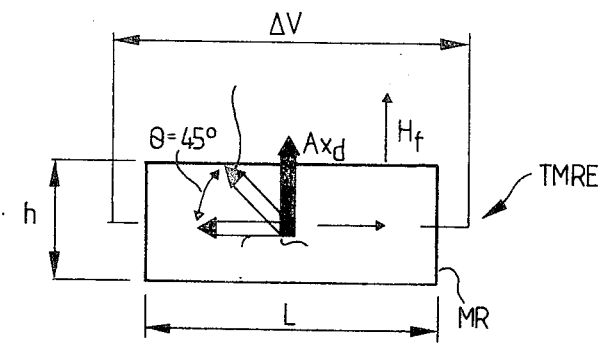
FIG. 1b shows how the magnetoresistor is arranged in relation to the magnetic overflow field of the data contained on the recording track.
Figure 1A:
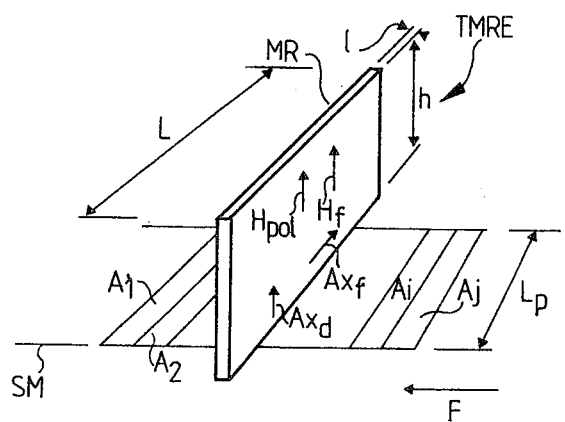
FIG. 1a is a fragmentary three-quarter perspective view showing a magneto-resistor placed facing a magnetic recording medium.
Figure 2:
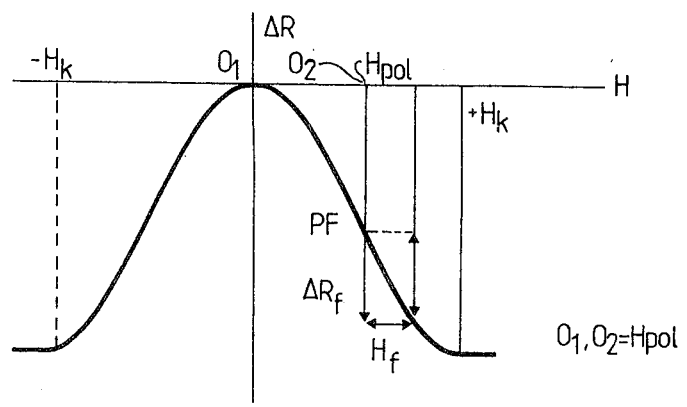
FIG. 2 illustrates a curve of the variation of R of a magnetoresistor of an anisotropic magnetic material as a function of the magnetic field applied to it in the direction of its axis of difficult magnetization. This makes it possible to better understand the principle of polarization of a magnetoresistor in which the axis of difficult magnetization has such a direction.
Figure 5:
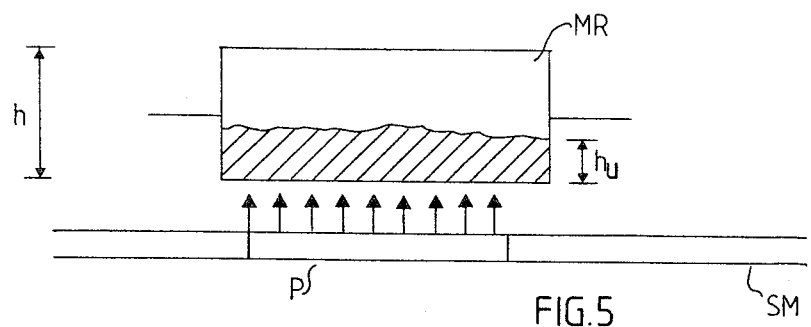
FIG. 5 is a fragmentary sectional view showing the magnetoresistor and a portion of a track P, located in a plane perpendicular to the recording medium and parallel to the direction in which the data pass.
Figure 4:
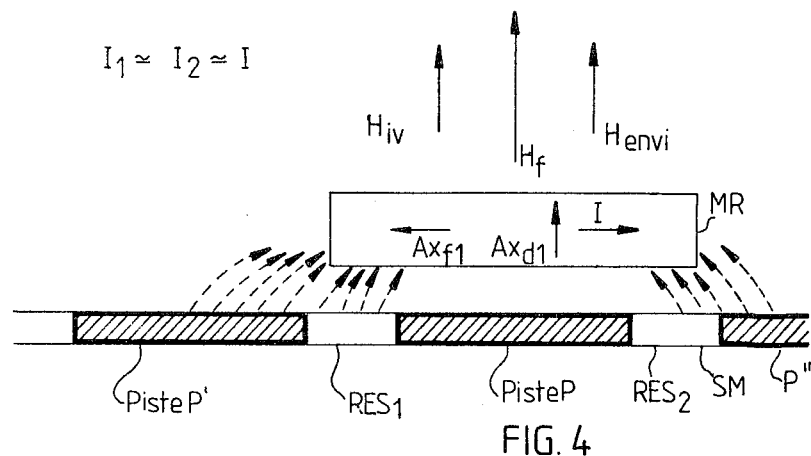
FIG. 4 is a fragmentary sectional view in a plane normal tao the recording medium and to the direction in which the data pass.
Figure 3:
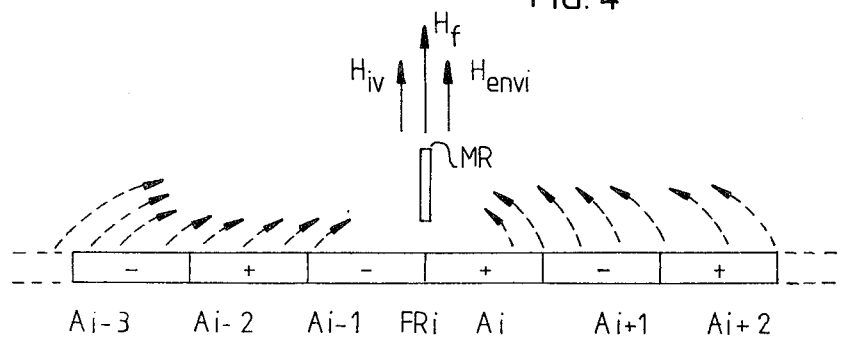
FIG. 3 is a diagrammatic view showing a portion of a track P located in a plane perpendicular to the recording medium and parallel to the direction in which the data pass.
Figure 6:
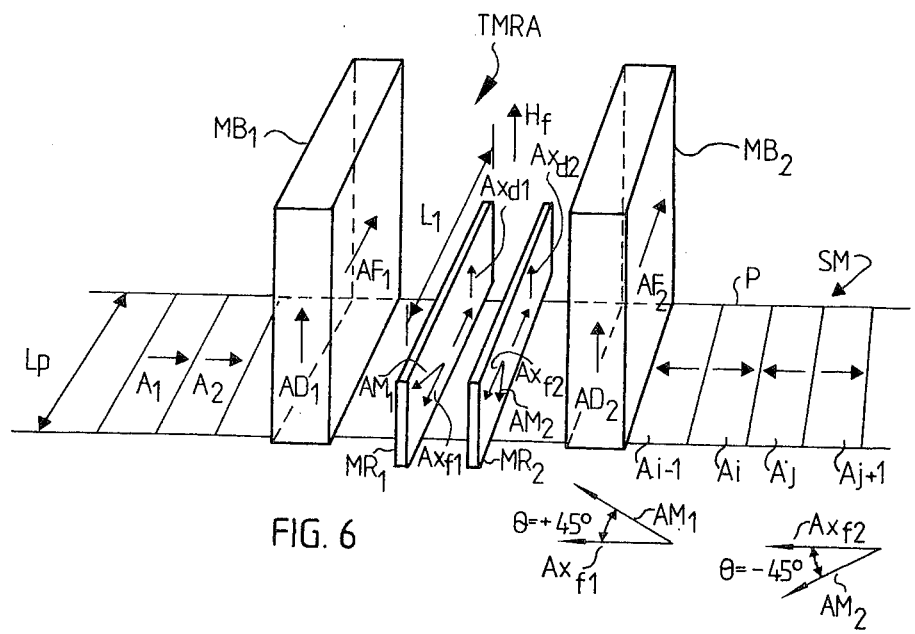
FIG. 6 is a fragmentary three-quarters perspective view showing a magnetoresistant transducer including two magnetoresistors equipped with magnetic screening means according to the prior art disposed on either side of the two magnetoresistors in a direction parallel to the direction which the data pass.

In order to better understand how the magnetoresistant transducer according to the invention is constituted, it is advantageous to first summarize the operating principles of the magnetoresistors illustrated by FIGS. 1a, 1b, and 2; the problems of utilizing these magnetoresistors in cases where the data density is very high, as illustrated by FIGS. 3, 4 and 5; and finally the problems associated with magnetoresistant transducers having two magnetoresistors according to the prior art as illustrated by FIGS. 5 and 6.

Referring to FIGS. 1a and 1b, there is illustrated an elementary magnetoresistant transducer TMRE consisting of a single magnetoresistor MR. In FIG. 1a, magnetoresistor MR is shown arranged facing the track P of a magnetic recording medium SM, such as magnetic disk. The width L of the magnetoresistor is appreciably greater than the width $L_p$ of the track P. Its height h measured perpendicularly to the medium SM is, for example, on the order of 20 to 30 microns. The length L is greater than the width 1 (also called thickness of the magnetoresistor). At both of its ends, the magnetoresistor MR has junction condcutors (not shown in order to simplify FIG. 1a) allowing it to be connected to circuits for reading data contained on the medium SM. The magnetoresistor MR consists of an anisotropic magnetic material. Its axis $Ax_f$ of easy magnetization is parallel to its length, and its axis $Ax_d$ of difficult magnetization is perpendicular to this large dimension and to the medium SM. The magnetoresistor MR is supplied by a current I which circulates, for example, in the direction indicated in FIGS. 1a and 1b, i.e., parallel to the axis $Ax_f$.

The magnetoresistor MR is subjected to the component $H_f$ of the magnetic overflow field created by the elementary magnetic ranges of a track P of the medium (some of the ranges, namely $A_1, A_2 \ldots A_i$, are shown in FIG. 1a). The component $H_f$ is normal to the recording medium and thus parallel to the axis of difficult magnetization $Ax_d$.

FIG. 2, which shows the curve of variation R of the resistance R of the magnetoresistor MR as a function of the magnetic field H applied to it along its axis of difficult magnetization $Ax_d$, makes it possible to better understand the operation of the elementary magnetoresistant transducer TMRE. It can be seen that, for a value of H called "field of anisotrophy of the material" and also defined as $H_k$, the magnetic material constituting the magnetoresistor is saturated in its direction of difficult magnetization so that the resistance R no longer varies. It is possible to give the magnetiation so that the resistance R no longer varies. It is possible to give the magnetoresistor MR a maximum sensitivity by displacing the axis of the ordinates in FIG. 2 from the origin $O_1$ to the origin $O_2$ by subjecting it to a field $H_{pol}$ of polarization as is indicated in the aforenoted French Pat. No. 2,165,206. This field $H_{pol}$ is produced by an outside source not shown in order to simplify FIG. 1a and is parallel to the axis of difficult magnetization $Ax_d$ and consequently parallel to the component $H_f$ of the magnetic overflow field of data in the medium SM and normal to the plane of the recording medium. In the case where the magnetoresistor is subjected to this magnetic field of polarization, the variation R in its magnetoresistance is relatively significant and may even be maximum for a given value of the field $H_{pol}$ corresponding to a rotation in the direction of magnetization in relation to its position at rest by an angle of close to 45°. Hence a relatively weak modification H in the magnetic field applied to the magnetoresistor leads to a relatively significant variation R in its resistance. We thus define an operating point PF by the abscissa of which $O_1 O_2$ is equal to $H_{pol}$. If the magnetoresistor is subjected to the component $H_f$ of the magnetic overflow field of the data in the medium, there results a variation in resistance $\Delta r_f$ and a voltage picked up at the output terminals $\Delta v = I \times \Delta R_f$. It is thus shown that around the operating point PF the variation in resistance is a function of the magnetic overflow field applied to the magnetoresistor in the direction of its axis in this field.

Referring to FIG. 3, it can be seen that the reading of a piece of information by the magnetoresistor MR takes place when the latter is placed facing two elementary magnetic ranges $A_{i-1}$ and $A_i$ of the track P of the medium SM. The magnetoresistor takes a relative position facing the boundary $FR_i$ of the two magnetic ranges $A_{i-1}$ and $A_i$. The magnetoresistor is not only subjected to the component $H_f$ of the magnetic overflow field produced by the two ranges $A_i$ and $A_{i-1}$, but also to the resultant of the magnetic overflow fields produced respectively by the couples of neighboring magnetic ranges and opposite magnetic induction couples, for example, the magnetic couples $$A_{i-1}, -A_{i-2}, A_{i-2}, -A_{i-3}, A_i - A_{i+1},$$
$$A_{i+1} - A_{i+2}, \text{ etc.}$$

This resultant, called $H_{iv}$, becomes significant in relation to the component $H_f$ when the linear density of the data on the track P becomes extremely high (greater than 5000 pieces of information per centimeter). Referring to FIG. 4, let us consider the magnetoresistor MR which is placed facing the track P and is assumed to be perfectly centered above it, which means that the axis of symmetry of the magnetoresistor and the circular axis of symmetry of the track P which are normal to the medium SM are confused.

When the radial density of the data becomes very significant, the magnetoresistor MR is subjected to the resultant $H_{envi}$ of the magnetic overflow fields produced by the two neighboring tracks P' and P'' of the track P and by the two residues $RES_1$ and $RES_2$ of data which bear witness to the prior state of the medium SM, i.e., the state this medium had before recording of the tracks P, P', P", etc. It can be seen that the residue $RES_1$ is located between the track P and the track P', while the residue $RES_2$ is located betwen the track P and the track P", etc. This resultant $H_{envi}$ produces a significant noise signal at the terminals of the magnetoresistor in relation to the signal produced by the component $H_f$.

Referring to FIG. 5, when the density of the data is very high, the value of the component $H_f$ drops in such a way that only a part of the magnetoresistor MR is subjected to this field, which part is indicated by oblique dashes in FIG. 5. It can be seen that the magnetoresistor is subjected to this field only over a height $h_u$ that is appreciably lower than the total height h of the magnetoresistor. As hereinbefore indicated, under these conditions, i.e., those shown in FIGS. 3, 4 and 5, the signal/noise SN ratio of the magnetoresistor MR is considerably weakened when the linear and radial data density is increased.

In current practice, in order to eliminate the drawbacks mentioned above with the aid of FIGS. 3, 4 and 5, transducers are used such as the transducer TMRA shown in FIG. 6. Such a transducer has two magnetoresistors $MR_1$ and $MR_2$ parallel to one another, and first and second magnetic screening means $MB_1$ and $MB_2$. This transducer TMRA is shown placed facing the track P of a recording medium SM, of which several elementary magnetic ranges have been shown, namely the ranges $A_1$, $A_2$, $A_{i-1}$, ... $A_i$, $A_j$, $A_{j+1}$. The elements $MR_1$ and $MR_2$ are strictly identical to the element MR shown in FIGS. 1a and 1b, and a current I runs through them in the direction of their length. Let $L_1$, $AX_{f1}$, $AX_{d1}$ be respectively, the length, the axis of easy magnetization and the axis of difficult magnetization of the magnetoresistor $MR_1$. Likewise, let $L_2$, $AX_{f2}$, $AX_{d2}$ be respectively, the length, the axis of easy magnetization and the axis of difficult magnetization of the magnetoresistor $MR_2$. The lengths $L_1$ and $L_2$ are essentially equal to one another, and their width is essentially greater than the width $L_p$ of the track P.

The two magnetoresistors are polarized as follows: the magnetization $AM_1$ of the magnetoresistor $MR_1$ creates an angle of more than 45° with the axis of easy magnetization $AX_{f1}$, i.e., with the position which the magnetization $AM_1$ had when the magnetoresistor $MR_1$ was at rest, while the magnetization $AM_2$ of the magnetoresistor $MR_2$ creates an angle of $-45°$ with the axis of easy magnetization $AX_{f2}$, i.e., with the position which the magnetization $AM_2$ had when the magnetoresistor $MR_2$ was not subjected to any magnetic field. The two magnetizations $AM_1$ and $AM_2$ of the magnetoresistors between therefore make an angle of 90°.

The magnetic screening means $MB_1$ and $MB_2$ are of an anisotropic magnetic material and have an axis of easy magnetization, respectively $AF_1$ and $AF_2$, and an axis of difficult magnetization, respectively $AD_1$ and $AD_2$. The axes $AF_1$ and $AF_2$ are parallel to the axes $Ax_{f1}$ and $Ax_{f2}$, while the axes of difficult magnetization $AD_1$ and $AD_2$ are parallel to the axes of difficult magnetization $Ax_{d1}$ and $Ax_{d2}$.

The distance betwen the two magnetoresistors is sufficiently short for them to be subjected to virtually the same component $H_f$ of the magnetic overflow field produced by the data couple $A_{i-1}$ and $A_i$, reading of the data taking place when $MR_1$ and $MR_2$ are essentially equidistant from the boundary $FR_i$ separating these two ranges.

The screening means $MB_1$ and $MB_2$ make it possible to channel and pick up the magnetic field lines from the resultant $H_{iv}$ of the magnetic overflow fields produced by the magnetic range couples of the track P found on either side of the range couple $A_{i-1}-A_i$ whose boundary the two magnetoresistors face.

As indicated above, the voltage $\Delta v_1$ delivered by the resistor $MR_1$ and the voltage $\Delta v_2$ delivered by the magnetoresistor $MR_2$ are sent over a first and second lead-in repsectively of a differential amplifier, at the outlet of which a signal is picked up proportional to twice the absolute value of $\Delta v$, which is essentially equal to the absolute value of $\Delta v_1$ and $\Delta v_2$. The use of a differential amplifier also allows reducing the noise signal (due in particular to the magnetic data on the tracks neighboring the track P and the data residues such as $RES_1$ and $RES_2$ shown in FIG. 4).

Figure 7:
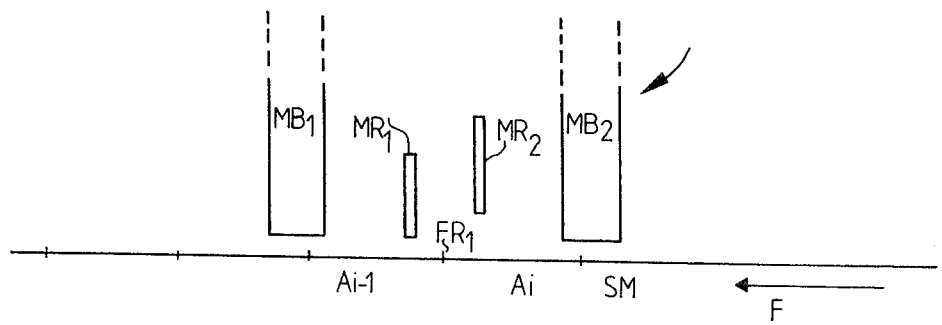
FIG. 7 is a fragmentary side view of a transducer identical to the onte in FIG. 6.

As indicated above, the magnetoresistant transducers such as the TMRA transducer have a certain number of drawbacks when the data density becomes very high (greater than 5000 pieces of information per centimeter). These transducers become technologically difficult to achieve, and therefore costly. Phenomena of mutual inductance develop between the magntic screening means $MB_1$, $MB_2$ and the magnetoresistors $MR_1$ and $MR_2$ which modify the magnetic state of the magnetoresistor (intensity of magnetization, value of the angle of polarization). This results in detection of the component $H_f$ of the magnetic overflow field produced by the range couple $A_{i-1}$ and $A_i$ being appreciably perturbed, which may go as far as the complete destruction of the useful information, i.e., of the two voltages $\Delta v_1$ and $\Delta v_2$ resulting from the variation in resistance of the two magnetoresistors subjected to this component $H_f$. Finally, a third drawback is illustrated in FIG. 7. Because of the technological difficulties of achieving the TMRA transducer, the two magnetoresistors $MR_1$ and $MR_2$ are very often staggered in relation to one another, so that the distance between the first magnetoresistor $MR_1$ and the medium SM is different from the distance separating the magnetoresistor $MR_2$ from this same medium. This results in the two signals $\Delta v_1$ and $\Delta v_2$ being quite appreciably different, which further considerably perturbs the outlet signal from the differential amplifier connected to the transducer TMRA.

Figure 8A:
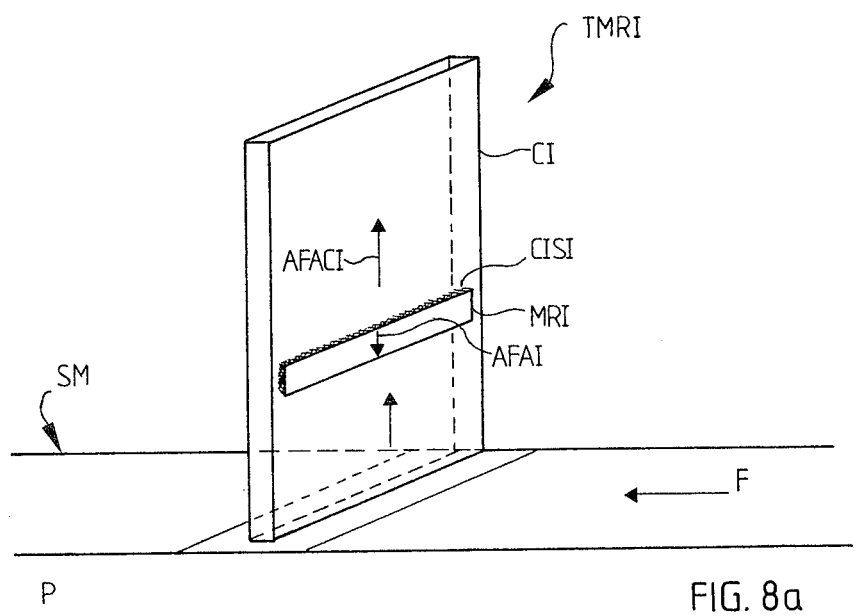
FIG. 8a is a fragmentary three-quarters perspective view showing a transducer above a track P of a recording medium and FIG. 8b is a side view showing such a transducer above two elementary magnetic ranges of a track P of a recording medium.
Figure 8B:
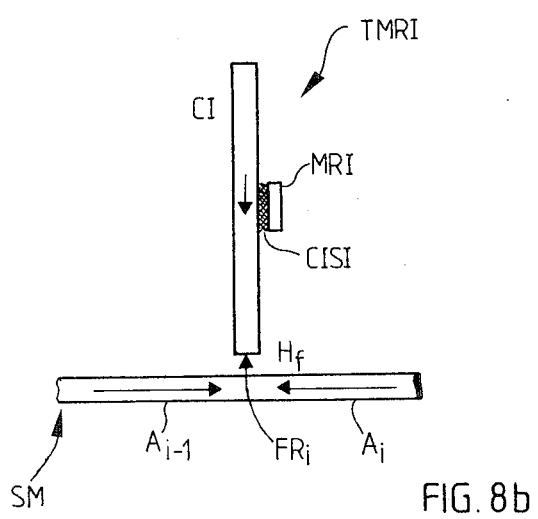

The transducer TMRI according to the invention makes it possible to remedy the drawbacks listed above. Its principle, illustrated by FIGS. 8a and 8b, consists of utilizing a magnetoresistor MRI in which the axis of easy magnetization AFAI is perpendicular to the plane of the recording medium SM. This magnetoresistor MRI is strongly coupled magnetically with a thin, magnetic, mono-range layer CI. The plane of the latter is perpendicular to the plane of the recording medium and to the direction F in which the data pass. This monorange layer consists of an anisotropic magnetic material, and its axis of easy magnetization AFACI is perpendicular to the plane of the recording medium SM and opposite in direction to the axis of easy magnetization AFAI of the magnetoresistor MRI. A nonmagnetic layer CISI is placed between the magnetoresistor MRI and the magnetic mono-range layer CI.

The operation of the magnetoresistant transducer TRMI according to the invention will be better understood by referring to the FIGS. 9 and 10.

In FIG. 9 the transducer TMRI has been shown occupying three different positions $POS_1$, $POS_2$, $POS_3$ before three magnetic range couples, namely $A_{i-1}-A_i$, $A_i-A_{i+1}$, $A_{i+1}-A_{i+2}$, of respective boundaries $FR_i$, $FR_{i+1}$, $FR_{i+2}$. When the transducer TMRI is placed facing the boundary $FR_i$, it occupies the position $POS_1$; when it is facing the boundary $FR_{i+1}$ it occupies the position $POS_2$, and finally when it is facing the boundary $FR_{i+2}$ it occupies the position $POS_3$. This manner of illustration makes it possible to consider the manner in which data is read by a single transducer as the medium is driven past the reading head.

When the transducer TMRI occupies the position $POS_1$ the component $H_f$ of the overflow field produced by the range couple $A_{i-1}-A_i$ has the same direction as the axis of easy magnetization AFACI of the magnetic mono-range layer CI.

Referring to FIG. 10, which represents the hysteresis cycle of the magnetic material constituting the layer CI, it can be seen that whatever the value of the magnetic field H, if it remains positive the induction B (magnetization) in the layer CI remains positive and equal to $B_r$. If, consequently, there is no variation of direction in the magnetization (of the axis of easy magnetization AFAI) of the magnetoresistor MRI and, consequently, there is no variation in resistance in it (therefore, no signal at its terminals).

When the transducer TMRI occupies the position $POS_2$, the component of the magnetic overflow field $H_{f(i+1)}$ produced by the magnetic range couple $A_i-A_{i+1}$ is opposite in direction to the component $H_{fi}$. This is defined as being negative in direction. By referring to the hysteresis cycle in FIG. 10 (this cycle, which is rectangular, is an ideal cycle corresponding to an ideal magnetic material, and it is obvious that in practice the real hysteresis cycles of the real magnetic materials are not strictly rectangular), we see then that we go from a positive magnetic field value H, as was the case for $H_{fi}$, to a negative magnetic field value, as is the case for $H_{f(i+1)}$, $H_{f(i+1)}$ being less than $-H_c$ where $H_c$ is the coercive field of the magnetic material constituting the layer CI; the magnetization in the latter (and also the axis of easy magnetization AFACI) changes direction completely, going from the value $+B_r$ to $-B_r$.

This complete change in direction of the magnetization (also of the axis of easy magnetization AFACI), because of the strong magnetic coupling between the layer CI and the magnetoresistor MRI, brings on a complete change in direction of the magnetization (complete change of the axis of easy magnetization AFACI) in the latter.

It is assumed that the coercive field HC of the magnetoresistor is less (in absolute value) than the coercive field $H_c$ of the layer CI.

To determine the variation in resistance of the magnetoresistor, reference may be had to FIG. 11a. The magnetic field applied to this magnetoresistor varies from a positive value ($H_{fi}$) to a negative value ($H_{fi+1}$) lower than $-HC$ (i.e., greater in absolute value than $|HC|$). We have in fact $|H_{fi+1}|>|Hc|$, itself greater than $|HC|$.

In the case of an ideal magnetic material with a perfectly rectangular hysteresis cycle, the curve of variation of resistance $\Delta R/R$ as function of the magnetic field applied is given by the abscissa half-line $-HC$, which half-line is called $PDT_1$. This curve is also called a DIRAC peak. To simplify, this curve will be called the theoretical DIRAC peak.

When the magnetic material constituting the magnetoresistor is a real magnetic material having a nonrectangular hysteresis cycle, the curve of variation of magnetoresistance is given by the curve $PDR_1$, which to simplify will be called the real DIRAC peak.

When the transducer TMRI occupies the position $POS_3$, it faces the boundary $FR_{i+2}$ between the two magnetic ranges $A_{i+1}$ and $A_{i+2}$ and is subjected to the magnetic field component $H_{f(i+2)}$ which is positive and created by these two ranges, in the vicinity of their boundary $FR_{i+2}$. It can be seen that the component $H_{f(i+2)}$ is opposite in direction to the direction of the magnetization in the layer CI, when the transducer occupies the position $POS_2$ (referring still to FIG. 9).

$H_{f(i+2)}$ being positive and greater than the coercive field $H_c$ of the magnetic material consituting the layer CI, by referring to the hysteresis cycle for this material shown in FIG. 10 we can see that the magnetization in the layer CI (and consequently the axis of easy magnetization AFACI) changes direction, going from the value $-B_r$ to the value $+B_r$, since the magnetic overflow field to which the layer is subjected goes from a negative value to a positive value. This brings about a change in direction of the magnetization in the magnetoresistor MRI (and consequently a change in direction of the axis of easy magnetization AFAI). The curve of variation of the magnetoresistance coefficient of the magnetoresistor MRI, which makes it possible to determine the variation in resistance of it, is then indicated by the FIG. 11b, since the magnetic field to which the magnetoresistor is subjected varies from a negative value ($H_{f(i+1)}$ in FIG. 2) to a positive value greater than HC. As in the case of FIG. 11a, for an ideal magnetic material having a perfectly rectangular hysteresis cycle, the curve of variation is given by the abscissa half-line $+HC$, namely the half-line $PDT_2$, called theoretical DIRAC peak, while for a real magnetic material having a nonrectangular hysteresis cycle the curve of variation of the magnetoresistance coefficient is given by the curve $PDR_2$, which we call real DIRAC peak for simplification.

Whether the curve of variation of the magnetoresistance coefficient is that indicated in FIG. 11a or that indicated in FIG. 11b, with the magnetoresistor MRI being traversed in the direction of its length by a current I, there results a corresponding variation in voltage $\Delta v = I \times \Delta R$ which is a voltage pulse having the form of a DIRAC peak.

When the medium SM passes before the transducer TMRI according to the invention, the phenomena of variation in the direction of the magnetization in the layer CI and in the magnetoresistor MRI, as well as the variations in resistance of the magnetoresistor resulting from this are reproduced identically to those described above, when the transducer according to the invention occupied the position $POS_2$ or the position $POS_3$.

Figure 12:
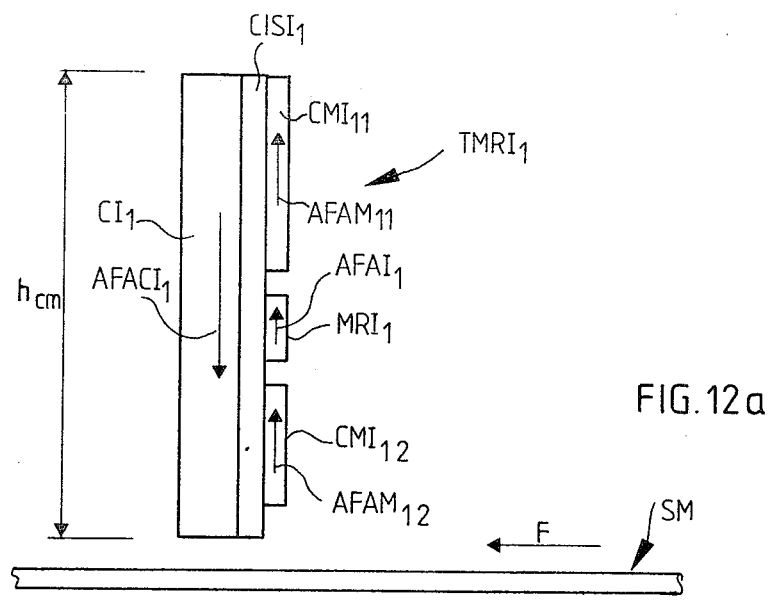
FIG. 12 illustrates a preferred embodiment of the magnetoresistant transducer according to the invention and comprises FIG. 12a which is a side view and FIG. 12b which is a three-quarters perspective view.
Figure 12:
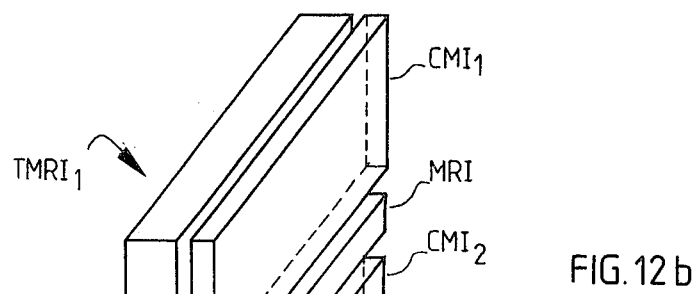

FIG. 12 shows a preferred embodiment of a transducer according to the invention $TMRI_1$. This transducer includes a thin, mono-range magnetic layer $CI_1$ having a height $h_{cm}$, in which the plane is perpendicular to the direction in which the data pass defined by the arrow F, and also perpendicular to the plane of the recording medium SM which carries these data, a nonmagnetic insulating layer $CISI_1$, the height of which measured perpendicularly to the medium SM is essentially equal to $h_{cm}$ and the thickness of which is between 100 and 500 angstroms, approximately, a first and second magnetic layer $CMI_{11}$ and $CMI_{12}$ of essentially equal dimensions, a magnetoresistor $MRI_1$ placed between the two layers $CMI_{11}$ and $CMI_{12}$ and on the insulating layer CISI. The thin magnetic layers $CMI_{11}$ and $CMI_{12}$ and the magnetoresistor $MRI_1$ are preferably made of the same anisotropic magnetic material.

The axes of easy magnetization $AFAM_{11}$, $AFAM_{12}$, $AFAI_1$ of the magnetic layers $CMI_{11}$–$CMI_{12}$ of the magnetoresistor $MRI_1$ have the same direction (and consequently magnetizations in these layers and in the magnetoresistor). These axes of easy magnetization are parallel to the axis of easy magnetization $AFACI_1$ and opposite in direction to it. The length of the magnetoresistor is slightly greater than the width $L_p$ of a track P of the medium SM, as can be seen in FIG. 12b.

The purpose of the thin magnetic layers $CMI_{11}$ and $CMI_{12}$ which, as can be seen in FIGS. 12a and 12b, are in the same plane as the magnetoresistor $MRI_1$, is to minimize the demagnetizing fields at the level of the magnetoresistor $MRI_1$ tending to break them up into different ranges with antiparallel magnetization (i.e., the magnetizations of two adjacent ranges have the same direction and different senses) and consequently to render the magnetoresistor ineffective, that is, to cancel out the effect which consists of recording a variation in resistance when it is subjected to any magnetic field.

Figure 13:
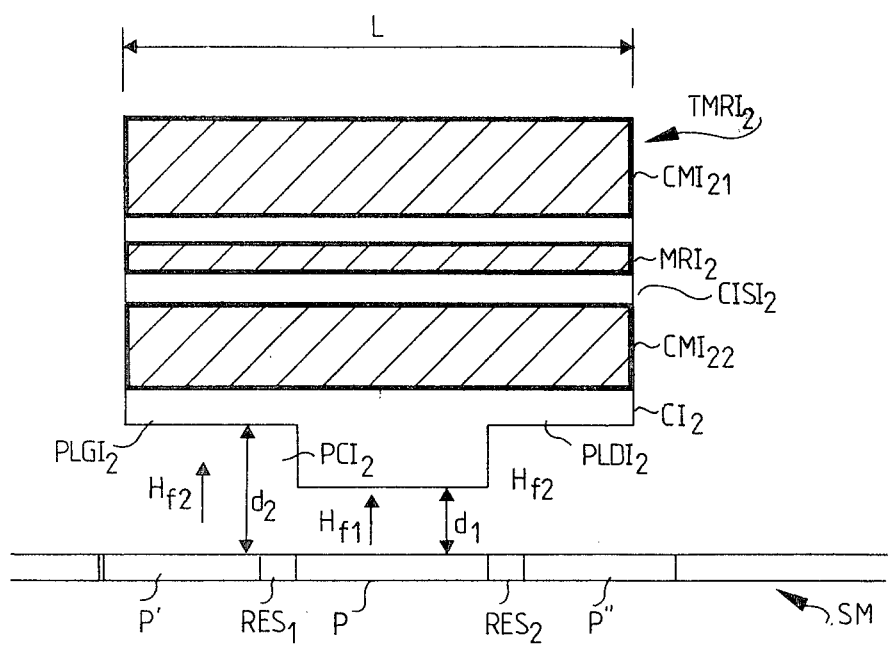
FIG. 13 shows an alternative embodiment of the magnetoresistant transducer according to the invention.

Let us consider FIG. 13, showing a transducer $TMRI_2$ according to the invention, which is a variant of preferred realization of the transducer shown in FIG. 12. This transducer $TRI_2$ has a mono-range magnetic layer $Cl_2$, thin magnetic layers $CMI_21$ and $CMI_22$ which are identical and surround the magnetoresistor $MRI_2$. The latter and the two magnetic layers $CMI_{21}$ and $CMI_{22}$ are disposed on a layer of nonmagnetic material $CISI_2$, the arrangement being disposed on the thin mono-range magnetic layer $Cl_2$. The exposed face of layer $CMI_{22}$ being placed against the upper flat face of mono-layer $Cl_2$. That part of the mono-range layer $Cl_2$ closest to the medium SM and which is also called the lower part of this layer may be broken down into three parts, namely a central part $PCl_2$ and two lateral parts $PLGI_2$ and $PLDI_2$. The central part $PCl_2$ is located at a distance from the magnetic recording medium SM equal to $d_1$, extremely short and less than the distance $d_2$ separating the parts $PLGI_2$ and $PLDI_2$ from the recording medium SM.

The length L of the magnetoresistor (which is essentially equal to the length of the thin mono-range layer $Cl_2$ and the thin layers $CMI_{21}$ and $CMI_{22}$) is noticeably larger than the radial width $L_p$ of the tracks of the medium (on the order of 2.4 times or more). FIG. 13 shows three of these tracks, namely the adjacent racks P′, P and P″.

Let $H_{f1}$ and $H_{f2}$ be respectively the components of the magnetic overflow field of the data produced by the magnetic range couples of the track P and the tracks P′ and P″, which penetrate respectively into the central part $PCl_2$ and into the lateral parts $PLGI_2$ and PLDI. It is clear that $H_{f1}$ is appreciably greater than $H_{f2}$ in absolute value.

The distances $d_1$ and $d_2$ are established such that Hhd f1 is greater in absolute value than the coercive field $H_c$ of the mono-range magnetic layer $Cl_2$, while $H_{f2}$ is less than this value of the coercive field. This results in only the component $H_{f1}$ of the magnetic overflow field created by the magnetic range couples of the track P being able to produce a reversal of the magnetization in the layer $Cl_2$, and consequently a reversal of the magnetization of the magnetoresistor $MRI_2$, and hence a variation in voltage at its terminals. The transducer $TMRI_2$ detects only the data on the track P, while having a relatively significant output signal, since the magnetoresistor $MRI_2$ has a high resistance because of its great length.

Figure 14:
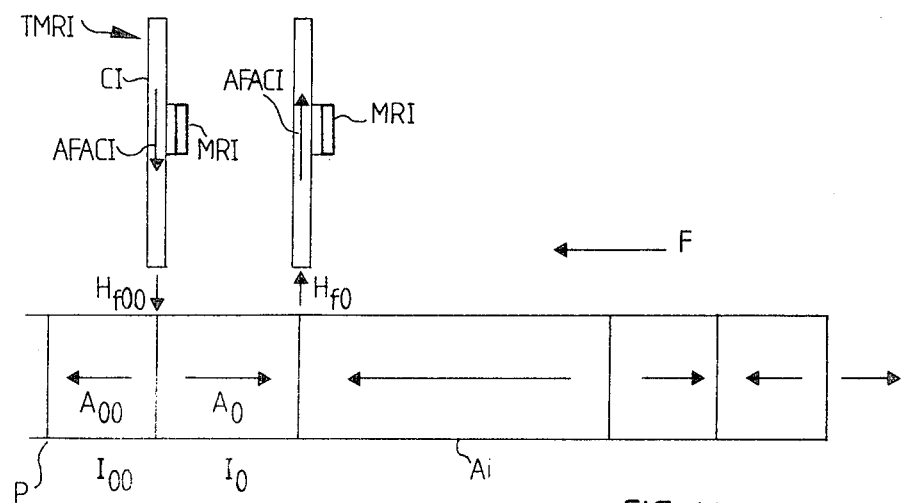
FIG. 14 diagrammatically illustrates how it is possible to write data on a magnetic recording medium so as to detect the direction of a piece of information.

FIG. 14 makes it possible to determine how the nature of the data read by a transducer according to the invention can be detected (in FIG. 14, the transducer TMRI has been shown, but it is obvious that the reasoning is identical for the transducers $TMRI_1$ or $TMRI_2$), i.e., in fact, the direction of the magnetic overflow field created by the magnetic range couples of a track P of the medium SM at right angles to the boundary separating them. On each track P at its start (the start of the tracks is found by the particular piece of information placed on the magnetic disk), there is created two special pieces of information $I_{00}$ and $I_0$, defined by the boundary between the elementary ranges $A_{00}$ and $A_0$ on the one hand and by $A_0$ and $A_1$ on the other. The component of the magnetic overflow field corresponding to the piece of information $I_{00}$ is designated by $H_{f00}$, while the component of the magnetic overflow filed corresponding to the piece of information $I_0$ is designated by $H_{f0}$. The direction of the two components $H_{f00}$ and $H_{f0}$ is assumed to be that indicated in FIG. 14. Two cases may then be produced:

First case: We assume that the magnetization (also the axis of easy magnetization (AFACI) in the mono-range layer CI has the same direction as the component $H_{f00}$. When the transducer TMRI is placed facing the piece of information $I_{00}$, the component $H_{f00}$ having the same direction as the axis of easy magnetization AFACI, there is no reversal of direction of magnetization in the layer CI and consequently no signal at the terminals of the magnetoresistor MRI. The piece of information $I_{00}$ is then not found. When the transducer TMRI, after having passed before the piece of information $I_{00}$, passes before the piece of information $I_0$, the component $H_{f0}$ having a direction opposite to the direction of the axis of easy magnetization AFACI, there is then a reversal in the direction of magnetization in the layer CI and consequently the appearance of a signal at the terminals of the magnetoresistor MRI; the piece of information $I_0$ can thus be found.

Second case: before passing before the piece of information $I_{00}$, the monorange layer CI of the transducer TMRI has a direction opposite that indicated in FIG. 14, i.e., a direction opposite the component $H_{f00}$. When the transducer TMRI passes at right angles to the piece of information $I_{00}$, there is a consequent reversal in the magnetization in the layer CI and consequently the appearance of a signal at the terminals of the magnetoresistor MRI. Likewise, when the transducer TMRI, after having passed before the information $I_{00}$ (the direction of its axis of easy magnetization is then that indicated by FIG. 14), passes before the piece of information $I_0$, the magnetization in the layer CI then having a direction opposite the component $H_{f0}$, there is again a reversal in the magnetization and consequently the appearance of a signal at the terminals of magnetoresistor MRI, and consequently the piece of information $I_0$ is found.

It can be seen that in both the first case and the second case, the piece of information $I_0$ is always found. The nature of the latter is perfectly well known, i.e., the direction of the component $H_{f0}$, and consequently the direction of the magnetization in the later CI is known because it is known that it passed before the piece of information $I_0$. As of that moment it is possible to determine the direction of the other pieces of information by simple deduction.

While the invention has been described in connection with particular embodiments, variations thereof will readily suggest themselves to those skilled in the art. Accordingly, it should be understood that the foregong description is not intended to be one of limitation and resort should be made to the appended claims intended to include all such variations which come within the full scope and true spirit of the invention.

I claim:

1. A magnetoresistant transducer (TMRI) for reading data on a recording medium (SM), comprising at least one magnetoresistor (MRI) of an anisotropic magnetic material perpendicular to the direction in which the data pass and traversed by a current I circulating in the direction of its length, said magnetoresistor having an axis (AFAI) of easy magnetization normal to the medium, and including a thin, magnetic, anisotropic, single domain layer (CI) normal to the recording medium and to the direction in which the data pass, said single domain layer (CI) being magnetically coupled with the magnetoresistor (MRI) and having an axis of easy magnetization (AFACI) normal to the medium and opposite in direction to the axis of easy magnetization of the magnetoresistor, said domain layer being magnetically coupled with the single magnetoresistor (MRI) in such a manner that a complete change of sense of the easy axis of magnetization in the single domain layer induces a complete change of sense of the easy axis of magnetization in the magnetoresistor.

2. A magnetoresistant transducer according to claim 1, further including an insulating layer (CICI$_1$) disposed on the thin single domain layer (CI$_1$) and having essentially the same height and same dimensions measured perpendicularly to the direction in which the data pass, a first and second thin, magnetic anisotropic layer (CMI$_{11}$–CMI$_{12}$) disposed on the nonmagnetic insulating layer (CISI$_1$) and surrounding the magnetoresistor (MRI$_1$), said magnetoresistor (MRI$_1$) being separated from the first and the second anisotropic layers by a part of the insulating layer (CISI$_1$), and the axes of easy magnetization of the first and the second anisotropic magnetic layers and the magnetoresistor having the same direction and sense.

3. A magnetoresistant transducer according to claim 2 wherein the thin, single domain magnetic layer (CI$_1$) has a central part (PCI$_2$) and two lateral parts surrounding said central part (PLGI$_2$, PLDI$_2$), the central part (PCI$_2$) being located at a distance from the magnetic recording medium equal to an extremely short distance d$_1$, said distance d$_1$ being less than a distance d$_2$ separating the lateral parts and said recording medium.

4. A magnetoresistant transducer according to claim 1, wherein the thin, single domain magnetic layer (CI$_1$) has a central part (PCI$_2$) and two lateral parts surrounding said central part (PLGI$_2$, PLDI$_2$), the central part (PCI$_2$) being located at a distance from the magnetic recording medium equal to an extremely short distance d$_1$, said distance d$_1$ being less than a distance d$_2$ separating the lateral parts and said recording medium.

5. A magnetoresistant transducer (TMRI) for reading data recorded on a movable medium (SM), comprising at least one magnetoresistor (MRI) of an anisotropic magnetic material disposed transverse to the direction in which the data pass as the medium moves past the transducer so as to be traversed by a current I circulating in the direction of its length, said magnetoresistor having an axis (AFAI) of easy magnetization normal to the medium, and further including a magnetic, anisotropic single domain layer (CI) disposed transversely of and normal to the recording medium and to the direction in which the data pass, said mono-range layer (CI) being magnetically coupled with the magnetoresistor (MRI) and having an axis of easy magnetization (AFACI) normal to the medium and opposite in direction to the axis of easy magnetization of the magnetoresistor, said domain layer being magnetically coupled with the single magnetoresistor (MRI) in such a manner that a complete change of sense of easy axis of magnetization in the single domain layer induces a complete change of sense of the easy axis of magnetization in the magnetoresistor.

6. A magnetoresistant transducer according to claim 5, further including an insulating layer (CISI$_1$) disposed between the thin single domain layer (CI$_1$) and the magnetoresistor (MRI), said layer having essentially the same dimensions as the magnetoresistor.

7. A magnetoresistant transducer as set forth in claim 5, further including an insulating layer (CISI$_1$) disposed on a planar face of the single domain layer (CI$_1$) and between the mono-range layer and the magnetoresistor (MRI), a first and second thin, magnetic anisotropic layer (CMI$_{11}$–CMI$_{12}$) disposed on the nonmagnetic insulating layer (CISI$_1$) and on opposite sides of the magnetoresistor (MRI$_1$), and the axes of easy magnetization of the first and the second anisotropic magnetic layers and the magnetoresistor having the same direction and sense.

8. A magnetoresistant transducer according to claim 7, wherein the single domain magnetic layer (CI$_1$) has a central part (PCI$_2$) and two lateral parts surrounding said central part (PLGI$_2$, PLDI$_2$), central part (PCI$_2$) being located at a distance from the medium equal to a distance d$_1$, said distance d$_1$ being less than a distance d$_2$ separating the lateral parts and said recording medium.

9. A magnetoresistant transducer according to claim 5, wherein the single domain magnetic layre (CI$_1$) has a central part (PCI$_2$) and two lateral parts surrounding said central part (PLGI$_2$, PLDI$_2$), the central part (PCI$_2$) being located at a distance from the medium equal to a distance d$_1$, said distance d$_1$ being less than a distance d$_2$ separating the lateral parts and said recording medium.

* * * * *

UNITED STATES PATENT AND TRADEMARK OFFICE
CERTIFICATE OF CORRECTION

PATENT NO. : 4,488,194
DATED      : December 11, 1984
INVENTOR(S) : Michel HELLE It is certified that error appears in the above-identified patent and that said Letters Patent is hereby corrected as shown below:

Col. 15, line 31, delete "$(CICI_1)$" and substitute -- $(CISI_1)$ --.

Col. 15, line 53, delete "1" and substitute -- 2 --.

Signed and Sealed this

Twenty-second Day of October 1985

[SEAL]

Attest:

DONALD J. QUIGG

Attesting Officer

Commissioner of Patents and
Trademarks—Designate